(12) United States Patent
Cecchinelli

(10) Patent No.: US 8,894,428 B2
(45) Date of Patent: Nov. 25, 2014

(54) CONNECTING DEVICE FOR THE FLUID-TIGHT CONNECTION BETWEEN TWO PIPES IN AN INTERNAL COMBUSTION ENGINE

(71) Applicant: Ferrari S.p.A., Modena (IT)

(72) Inventor: Gaetano Cecchinelli, Formigine (IT)

(73) Assignee: Ferrari S.p.A. (IT)

( * ) Notice: Subject to any disclaimer, the term of this patent is extended or adjusted under 35 U.S.C. 154(b) by 82 days.

(21) Appl. No.: 13/750,605

(22) Filed: Jan. 25, 2013

(65) Prior Publication Data
US 2013/0196524 A1 Aug. 1, 2013

(30) Foreign Application Priority Data
Jan. 27, 2012 (IT) .................................. B012A0037

(51) Int. Cl.
*H01R 4/60* (2006.01)
*H01R 4/64* (2006.01)
*F16L 25/01* (2006.01)
*H01R 13/62* (2006.01)

(52) U.S. Cl.
CPC ............... *H01R 13/62* (2013.01); *F16L 25/01* (2013.01)
USPC .......................................... 439/191; 439/680

(58) Field of Classification Search
CPC ............................. H01R 13/005; E21B 17/028
USPC .................. 439/191, 190, 192, 194, 197, 680
See application file for complete search history.

(56) References Cited

U.S. PATENT DOCUMENTS

| | | | | |
|---|---|---|---|---|
| 3,082,394 A | * | 3/1963 | Hahn et al. | 439/191 |
| 4,188,081 A | * | 2/1980 | Holden et al. | 439/192 |
| 6,443,747 B2 | * | 9/2002 | Saba | 439/188 |
| 6,464,520 B2 | * | 10/2002 | Saba | 439/191 |
| 6,532,931 B1 | | 3/2003 | Saba et al. | |
| 6,698,410 B2 | * | 3/2004 | Saba et al. | 123/572 |
| 7,402,059 B2 | * | 7/2008 | Ciocci et al. | 439/191 |

FOREIGN PATENT DOCUMENTS

GB 2056611 A 3/1981
WO WO-2004/113711 A1 12/2004

OTHER PUBLICATIONS

"Italian Application Serial No. IT B020120037, Search Report dated Oct. 30, 2012", 2 pgs.

* cited by examiner

*Primary Examiner* — Hae Moon Hyeon
(74) *Attorney, Agent, or Firm* — Schwegman Lundberg & Woessner, P.A.

(57) ABSTRACT

A connecting device for the fluid-tight connection of a first and a second duct provided with a connector having a fixed electrical connection terminal; a mobile electrical connector for establishing an electrical connection with the fixed electrical connection terminal; a control unit suited to check the presence of a connection between the fixed electrical connection terminal and the mobile electrical connector; and an intermediate connecting body interposed in use between the connector and the mobile electrical connector, suited to establish an electrical connection between the fixed electrical connection terminal and the mobile electrical connector and suited to allow the fixed electrical connection terminal and the mobile electrical connector to be coupled to each other, only when there is a fluid-tight joint between the two ducts.

8 Claims, 3 Drawing Sheets

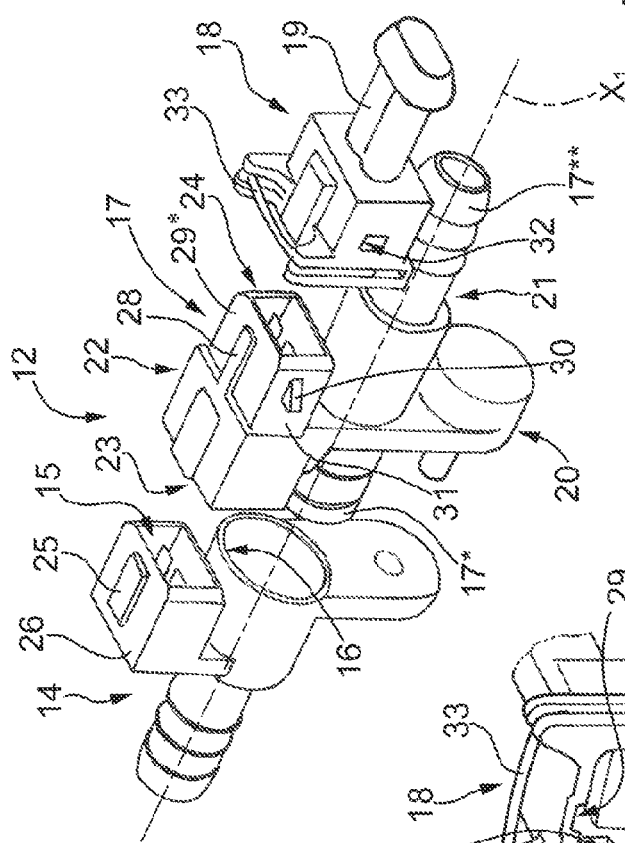
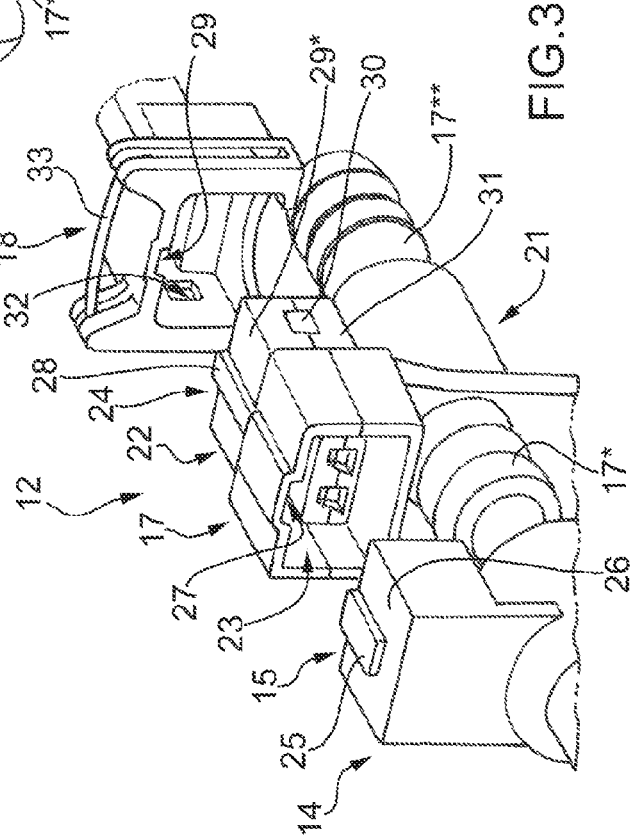

CONNECTING DEVICE FOR THE FLUID-TIGHT CONNECTION BETWEEN TWO PIPES IN AN INTERNAL COMBUSTION ENGINE

PRIORITY CLAIM AND RELATED APPLICATIONS

This application claims the benefit of priority under 35 U.S.C. Section 119 to Italian Patent Application Serial No. BO2012A 000037, filed on Jan. 27, 2012, which application is incorporated herein by reference in its entirety.

The present invention relates to a connecting device for the fluid-tight connection between two pipes of an internal combustion engine.

BACKGROUND OF THE INVENTION

Vapors (normally known by the name "blow-by gases") are normally produced in an internal combustion engine, in the heads and/or in the oil tank during the running of the engine itself; air pollution control regulations prohibit exhaust of such vapor into the atmosphere and require that they be fed into the cylinders for controlled combustion thereof. For such reason, an internal combustion engine is provided with a recirculating circuit which is provided with a feed duct originating from the engine head or from the oil tank and connected to an intake duct of the engine.

During routine servicing of the engine, the feed duct may be disconnected from the feed duct and/or engine head for cleaning or replacement or simply to permit easy access to other parts of the engine. Once disconnected from the feed duct and/or engine head, the feed duct may be reconnected poorly due to carelessness on the part of the fitter; such a situation easily goes undetected, by the vapors being released directly into the atmosphere and in no way impairing operation of the engine. For such reason, more recent air pollution regulations require correct connection control of the feed duct and that the driver be alerted of any faulty connection.

One solution to determine the correct connection of the feed duct is described in U.S. Pat. No. 6,532,931-B1, in which the feed duct is provided on the ends with connecting devices; each one of such connecting devices comprises a pneumatic connector for pneumatically connecting the feed duct to the intake duct or engine head, and an electrical connector. Each connecting device is designed so that the relative pneumatic connector is only connected to a corresponding pneumatic connector on the intake duct or engine head when the relative electrical connector is connected to a corresponding electrical connector on the intake duct or engine head; controlling the electrical continuity of the circuit formed by the mutual coupling of the electrical connectors it is possible to check whether the pneumatic connectors are correctly coupled to each other and thereby, it is possible to check the correct connection of the feed duct.

The connection system described in U.S. Pat. No. 6,532,931-B1, however, has some drawbacks in that it employs connecting devices comprising a pneumatic connector and an electrical connector in the same structure, which makes the proper cleaning of the pneumatic connector problematic; moreover, any change in the diameter of the pneumatic connector involves high-cost alteration of the connecting device as a whole.

On the other hand, patent application WO-A1-2004113711 describes a connecting system for the fluid-tight connection between an intake duct and a feed duct which comprises a connecting device, which is adapted to establish a fluid-tight joint between the two ducts and is provided with a fixed electrical connector, a mobile electrical connector, which is mechanically independent of the connecting device and of the second duct and is adapted to couple to the fixed electrical connector. The connecting system also comprises an interlocking device, preferably consisting of elastic spring means, which is adapted to allow the fixed electrical connector and the mobile electrical connector to be coupled to each other, only when there is a fluid-tight joint between the two ducts.

In other words, if the feed duct is not correctly inserted into the dedicated seat of the connecting device, i.e. if there is no fluid-tight joint between the intake duct and the feed duct, the mobile electrical connector cannot be coupled to the fixed electrical connector by the effect of the action of the interlocking device.

However, also the fluid-tight connecting system described in WO-A1-2004113711 has some drawbacks. In fact, it has been determined that the interlocking device may be tampered to allow the mobile electrical connector and the fixed electrical connector to be coupled to each other also when the feed duct is not correctly inserted into the dedicated seat of the connecting device.

SUMMARY OF THE INVENTION

The object of the present invention is to provide a connecting device for the fluid-tight connection between two ducts which is easy and inexpensive to make and at the same time is free from the above-described drawbacks.

According to the present invention, a connecting device is provided for the fluid-tight connection of two pipes of an internal combustion engine according to what claimed in claim 1 and, preferably, in any one of the subsequent claims either directly or indirectly depending on claim 1.

BRIEF DESCRIPTION OF THE DRAWINGS

The present invention will now be described with reference to the accompanying drawings, which illustrate a non-limiting example thereof, in which:

FIG. 2 shows a perspective, partially exploded view of a connecting device of FIG. 1;

FIG. 3 shows a perspective, enlarged scale view of a portion of the connecting device of FIG. 2.

DETAILED DESCRIPTION OF THE INVENTION

Figure 1:
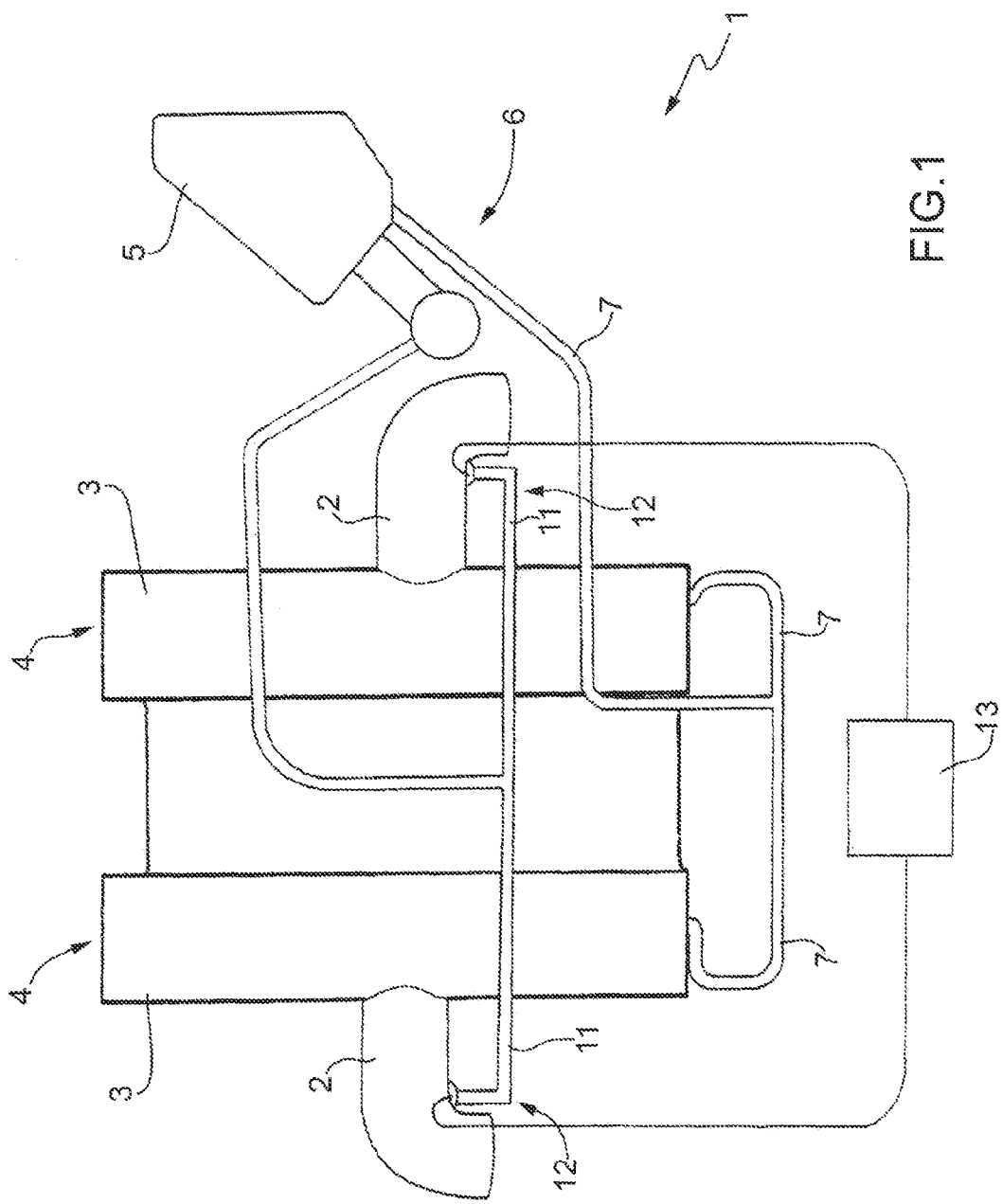
FIG. 1 shows a schematic view of an internal combustion engine with a recirculating circuit provided with a device for the fluid-tight connection between two pipes made according to the present invention.

In FIG. 1, reference numeral 1 globally indicates an internal combustion engine provided with a number of intake ducts 2; each of which ends in a corresponding intake manifold 3, which is fixed to the top of a respective cylinder head 4. The internal combustion engine 1 has a lubrication oil tank 5.

Engine 1 further comprises a recirculating circuit 6, which is adapted to capture the vapors formed into heads 4 and into the oil tank 5 for introducing such vapors into the intake manifolds 3 so as to determine the controlled combustion thereof inside the cylinders.

The recirculating circuit 6 comprises a pair of recovery ducts 7, which are connected to heads 4 for capturing the vapors formed into heads 4 and are connected by a T-shaped joint for leading together into the oil tank 5; and a feed duct 11 which directly draws into the oil tank 5, splits into two feed ducts 11 by means of a T-shaped joint to lead into the intake ducts 2 in the proximity of the intake manifolds 3 and downstream of the throttle valves (not shown in detail). Each feed duct 11 is connected to the respective intake duct 2 by means of a respective connecting device 12. The connecting devices 12 are connected to a common control unit 13 which is suited to check the correct connection of each feed duct 11 to the respective intake duct 2 and for alerting the driver of a possible faulty connection of a feed duct 11.

The internal combustion engine 1 comprises a number of connecting devices 12, equal to each other and independent of each other, only one of which will be described hereinafter.

According to what shown in FIGS. 2 and 3, the connecting device 12 comprises a connector 14, which is suited for the connection in use to the intake duct 2 by means of fixing means (of the known type and not shown).

Connector 14 comprises a fixed electrical connection terminal 15 and a seat 16 having a tubular shape and provided with an axis $X_1$, which is suited to accommodate, in use, a tubular side end 17* of an intermediate connecting body 17. An annular body (not shown) is provided on the feed duct 11, provided with a central through hole, coaxial to axis $X_1$ and adapted to define a seat for receiving a further tubular side end 17** of the intermediate connecting body 17, also coaxial to axis $X_1$.

The intermediate connecting body 17 is therefore connected, in use, to an end of the feed duct 11 for defining a tubular passage duct coaxial to axis $X_1$ and for establishing a fluid-tight joint between the intake duct 2 and the feed duct 11.

The connecting device 12 also comprises a mobile electrical connector 18 which is mechanically independent of both the intake duct 2 and the feed duct 11. The mobile electrical connector 18 is electrically connected to the common control unit 13 by means of a bipolar electrical conductor 19. The mobile electrical connector 18 is further mechanically independent of and separated from connector 14.

The mobile electrical connector 18 is suited to couple in use to the intermediate connecting body 17.

In particular, the intermediate connecting body 17 is suited to interpose, in use, between the fixed electrical connection terminal 15 and the mobile electrical connector 18 and is suited to allow the fixed electrical connection terminal 15 and the mobile electrical connector 18 to be coupled to each other only when the feed duct 11 is regularly connected to connector 14.

In other words, if the intermediate connecting body 17 is not correctly inserted into seat 16 of connector 14, i.e. if there is not a perfect fluid-tight joint between the intake duct 2 and the feed duct 11, the mobile electrical connector 18 cannot be coupled to the fixed electrical connection terminal 15. This is made possible by the action of the intermediate connecting body 17.

The intermediate connecting body 17 comprises a bottom end 20 suited for the fixing to connector 14, a central portion 21 and a top end 22. The central portion 21 is defined by the two tubular side ends 17*, 17** which in turn define the passage duct having a tubular shape and coaxial to axis $X_1$ and adapted to establish a hydraulic communication between the intake duct 2 and the feed duct 11. In fact, the tubular side end 17* is fitted into seat 16 of connector 14 whereas the tubular side end 17** is suited for the coupling to the feed duct 11.

The top end 22 comprises two projecting appendages indicated with reference numerals 23 and 24, respectively.

According to what shown in FIG. 2, in a step before assembly, appendage 23 is directly facing the fixed electrical connection terminal 15 whereas appendage 24 is directly fixing the mobile electrical connector 18. The two appendages 23 and 24 define an electrical connection between the fixed electrical connection terminal 15 and the mobile electrical connector 18. Appendage 23 is therefore suited to couple to the fixed electrical connection terminal 15 whereas appendage 24 is suited to couple to the mobile electrical connector 18.

The fixed electrical connection terminal 15 and the mobile electrical connector 18 are suited to establish an electrical continuity between the respective conductor bodies (not shown in detail), once the mutual coupling has been carried out with the interposition of the conductor bodies (shown in FIG. 4) of the intermediate connecting body 17.

When the control unit 13 determines the existence of an electrical continuity between the two conductors of the bipolar electrical conductor 19, then the mobile electrical connector 18 is coupled to the fixed electrical connection terminal 15, which short-circuits the conductor bodies (not shown in detail) of the same mobile electrical connector 18.

For the mobile electrical connector 18 to be coupled to the fixed electrical connection terminal 15 it is necessary that the intermediate connecting body 17 be correctly inserted into seat 16 of connector 14; i.e. there must be a fluid-tight joint between the intake duct 2 and the feed duct 11. From what described above it is clear that the control unit 13 can determine the correct connection of the feed duct 11 to the respective intake duct 2.

Device 12 is made so as to mechanically prevent the connection between the fixed electrical connection terminal 15 and the mobile electrical connector 18 when the feed duct 11 is disconnected from connector 14. In particular, such a result is achieved by the particular shape of the grooves and of the coupling elements of the intermediate connecting body 17 with the mobile electrical connector 18 and with the fixed electrical connection terminal 15, respectively.

In fact, the fixed electrical connection terminal 15 has a male connector element 25 which extends from a top wall 26 and is suited to couple to a coupling groove 27 obtained in appendage 23 directly facing the same fixed electrical connection terminal 15.

Likewise, appendage 24 directly facing the mobile electrical connector 18 has a male connector element 28 which extends from a top wall 29* and is suited to couple to a coupling groove 29 obtained in the mobile electrical connector 18 itself.

It should be noted that the two male connector elements, indicated with reference numerals 25 and 28, respectively (and accordingly the respective coupling grooves 27, 29) have different dimensions. In particular, according to the variant shown in FIGS. 2 to 4, the make connector element 25 has a plan width different (in particular, larger) from the plan width of the make connector element 28. According to a variant not shown, the make connector element 25 has a section thickness different from the thickness of the make connector element 28.

According to a further variant not shown, the make connector element 25 has both a plan width and a thickness different from the thickness of the make connector element 28.

According to a further variant not shown, the make connector element 25 and the make connector element 28 have different shapes.

In this way it is clear that, by the effect of the different dimensions of the male connector elements 25, 28 and of the respective coupling grooves 27, 29, the mobile electrical connector 18 cannot be directly coupled to connector 14. That is to say, the shape of the male connector elements 25, 28 and of the respective coupling grooves 27, 29 mechanically prevents the mobile electrical connector 18 from directly coupling to the fixed electrical connection terminal 15.

The intermediate connecting body 17 allows the connection between the fixed electrical connection terminal 15 and the mobile electrical connector 18 while the same connection is mechanically prevented, in the absence of the intermediate connecting body 17, by the male connector elements 25, 28 and by the respective coupling grooves 27, 29.

Figure 4:
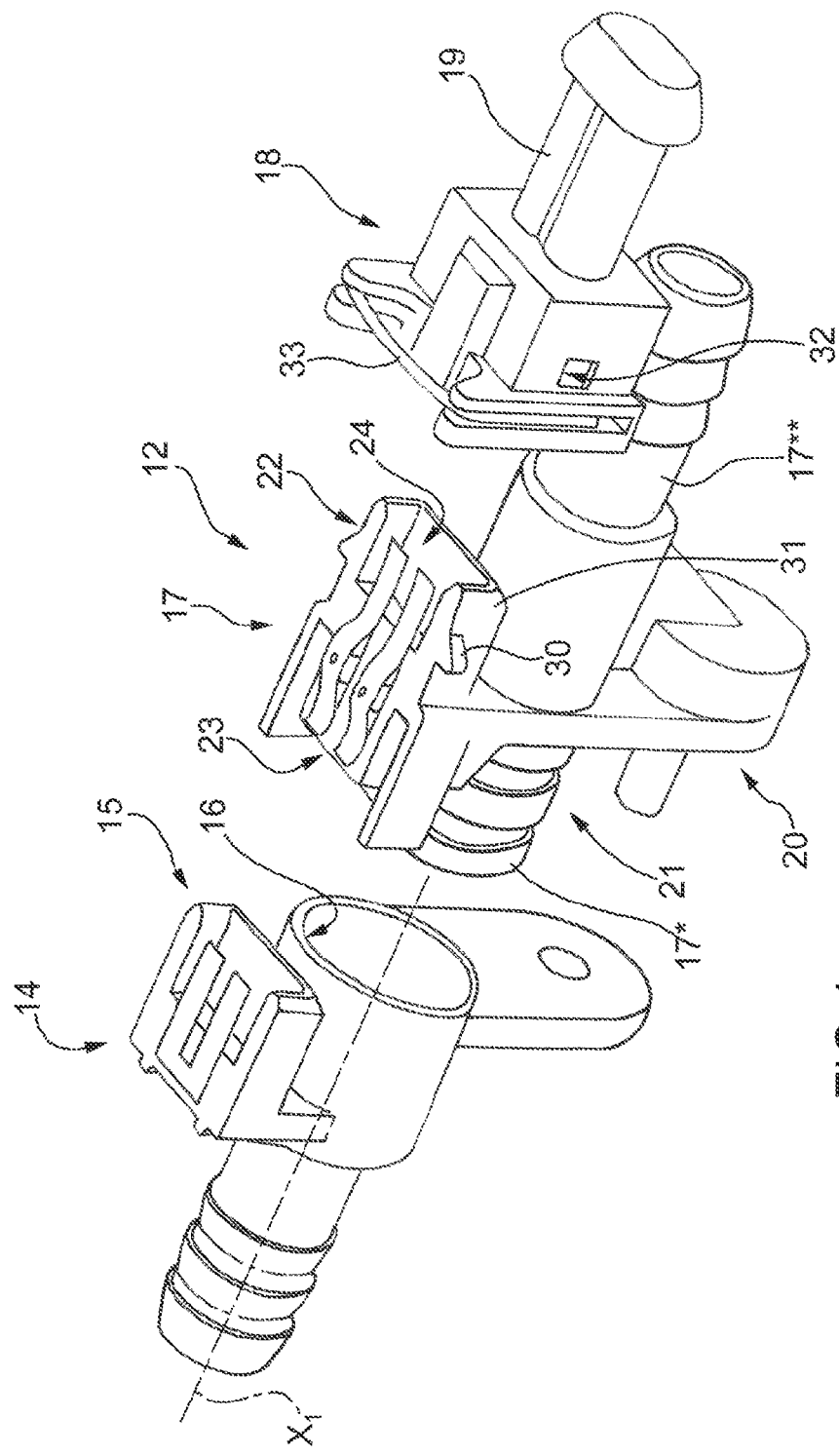
FIG. 4 shows a perspective, partially exploded view with removed parts for clarity purpose, of the connecting device of FIG. 2.

Moreover, appendage 24 has two wedges 30 (only one of wedges 30 is shown in FIGS. 2 to 4), which extend outwards from respective side walls 31 and are adapted to engage in use two respective through holes 32 obtained in the side walls of the mobile electrical connector 18. The coupling between wedges 30 and the through holes 32 allows the coupling of the mobile electrical connector 18 to the intermediate connecting body 17 to be made steadier.

According to a further variant, the wedges are arranged on appendage 23 and the through holes are obtained in the side walls of the fixed electrical connection terminal 15 for locking the intermediate connecting body 17 to the same fixed electrical connection terminal 15.

According to a preferred embodiment, an elastic fixing means 33 is further provided for locking the mobile electrical connector 18 to the intermediate connecting body 17 defined by a U-shaped metal body.

According to an alternative embodiment, connector 14 of the connecting device 12 is integral to the feed duct 11 and in particular, it is co-molded with the feed duct 11 so as to be non-separable from the feed duct 11 itself. Moreover, connector 14 is adapted to couple to the respective intake duct 2 for establishing a fluid-tight joint between the intake duct 2 and the feed duct 11.

The above description explicitly refers to the connection between the intake duct 2 and the feed duct 11 but it may find advantageous application in the fluid-tight connection of any duct in an internal combustion engine without loss of generality.

The fluid-tight connecting device 12 between two ducts described thus far has some advantages. Firstly, it is easy and inexpensive to make and secondly, it is not possible to tamper the same connecting device 12 to allow the mobile electrical connector 18 and the fixed electrical connector 15 to be coupled to each other when the feed duct 11 is not correctly inserted into the dedicated seat 16 of connector 14.

The invention claimed is:

1. A connecting device (12) for the fluid-tight connection of a first and a second duct (2, 11); the connecting device (12) comprises:
   a connector (14), which is suited to establish a fluid-tight joint between said two ducts (2, 11) and is provided with a fixed electrical connection terminal (15);
   a mobile electrical connector (18), which is mechanically independent of the first and the second duct (2, 11) and, furthermore, is mechanically separated from and independent of the connector (14) and is suited to establish an electrical connection with the fixed electrical connection terminal (15);
   a control unit (13), which is suited to check the presence of a connection between the fixed electrical connection terminal (15) and the mobile electrical connector (18); and
   an intermediate connecting body (17), which is interposed between the connector (14) and the mobile electrical connector (18), is suited to establish an electrical connection with both the fixed electrical connection terminal (15) and the mobile electrical connector (18), and is adapted to allow the fixed electrical connection terminal (15) and the mobile electrical connector (18) to be coupled to each other, only when there is a fluid-tight joint between the two ducts (2, 11);
   the connecting device (12) further comprising coupling means (25, 27; 28, 29) for coupling the intermediate connecting body (17) to the fixed electrical connection terminal (15) and to the mobile electrical connector (18) respectively; the coupling means (25, 27; 28, 29) being manufactured so as to mechanically prevent the fixed electrical connection terminal (15) and the mobile electrical connector (18) from being connected, when there is no fluid-tight joint between the two ducts (2, 11).

2. The connecting device according to claim 1, wherein the fixed electrical connection terminal (15), the mobile electrical connector (18), and the intermediate connecting body (17) all comprise bipolar electrical connectors, which are suited to establish an electrical continuity between the respective conductor bodies, once the mutual coupling has been carried out.

3. The connecting device according to claim 1, wherein the coupling means (25, 27) for coupling the intermediate connecting body (17) to the fixed electrical connection terminal (15) present shapes and/or sizes that are different from those of the coupling means (28, 29) for coupling the intermediate connecting body (17) to the mobile electrical connector (18).

4. The connecting device according to claim 1, wherein the coupling means (25, 27; 28, 29) comprise a male connector element (25; 28), which is suited to engage, in use, a respective coupling groove (27; 29).

5. The connecting device according to claim 1, wherein the connector (14) is integral to The first duct (2) and is suited to receive a second duct (11), so as to establish a fluid-tight joint between the two ducts (2, 11); the intermediate connecting body (17) being suited to allow the fixed electrical connection terminal (15) and the mobile electrical connector (18) to be coupled to each other, only when the second duct (11) is regularly connected to the connector (14).

6. The connecting device according to claim 1 and comprising an elastic fixing means (33) for locking the mobile electrical connector (18) to the intermediate connecting body (17).

7. The connecting device according to claim 1, wherein the intermediate connecting body (17) comprises a number of appendages (30), which protrude outwards; each appendage (30) is suited to engage, in use, a respective seat (32) obtained in the mobile electrical connector (18) and/or in the fixed electrical connection terminal (15), so as to lock the intermediate connecting body (17) to the mobile electrical connector (18) and/or to the fixed electrical connection terminal (15).

8. The connecting device according to claim 1, wherein a central portion (20) of the intermediate connecting body (17) is fitted into a respective seat (16) obtained in the connector (14).

* * * * *